(12) United States Patent
Mahy (10) Patent No.: US 11,455,130 B2
(45) Date of Patent: Sep. 27, 2022

(54) METHOD OF COLOR MAPPING OF OLIGOCHROMATIC PATTERNS

(71) Applicant: AGFA NV, Mortsel (BE)

(72) Inventor: Marc Mahy, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 17/283,047

(22) PCT Filed: Oct. 16, 2019

(86) PCT No.: PCT/EP2019/078026
§ 371 (c)(1),
(2) Date: Apr. 6, 2021

(87) PCT Pub. No.: WO2020/079038
PCT Pub. Date: Apr. 23, 2020

(65) Prior Publication Data
US 2021/0373817 A1 Dec. 2, 2021

(30) Foreign Application Priority Data

Oct. 17, 2018 (EP) ..................... 18200915

(51) Int. Cl.
*H04N 1/00* (2006.01)
*G06F 3/12* (2006.01)
(Continued)

(52) U.S. Cl.
CPC .......... *G06F 3/1208* (2013.01); *G06F 3/1253* (2013.01); *G06F 3/1282* (2013.01);
(Continued)

(58) Field of Classification Search
None
See application file for complete search history.

(56) References Cited

U.S. PATENT DOCUMENTS 5,268,754 A * 12/1993 Van de Capelle ........ G01J 3/46
358/518
2005/0237545 A1* 10/2005 Boll ..................... H04N 1/6058
358/1.9
(Continued)

FOREIGN PATENT DOCUMENTS

EP 0 611 231 A1 8/1994
WO 2014/045167 A1 3/2014

OTHER PUBLICATIONS

International Search Report dated Jan. 20, 2020 relating to PCT/EP2019/078026, 3 pages.
(Continued)

*Primary Examiner* — Henok Shiferaw
(74) *Attorney, Agent, or Firm* — Leydig, Voit & Mayer, Ltd.

(57) ABSTRACT

A method of color mapping color values of an oligochromatic pattern comprising the following steps: determining an image-gamut, in a N-dimensional device independent color system (ND-DICS), of said oligochromatic pattern; wherein said image-gamut comprises said color values of said oligochromatic pattern; and determining a skeleton (500) of said image-gamut; and performing an adaption on said skeleton (500) in said ND-DICS by a set of N-dimensional-transforming steps (30) and determining for points of said skeleton (500), a path in said ND-DICS that corresponds to said adaption; and color mapping said color values, of said oligochromatic pattern, based on said determined paths (35) of said points of said skeleton (500).

7 Claims, 4 Drawing Sheets

(51) Int. Cl.
*H04N 1/46* (2006.01)
*H04N 1/60* (2006.01)

(52) U.S. Cl.
CPC ..... *H04N 1/00023* (2013.01); *H04N 1/00039* (2013.01); *H04N 1/00076* (2013.01); *H04N 1/46* (2013.01); *H04N 1/6019* (2013.01); *H04N 1/6033* (2013.01); *H04N 1/6066* (2013.01); *H04N 1/6075* (2013.01); *H04N 1/6097* (2013.01)

(56) References Cited

U.S. PATENT DOCUMENTS

| | | | |
|---|---|---|---|
| 2010/0271665 A1 | 10/2010 | Wen et al. | |
| 2011/0299128 A1* | 12/2011 | Mestha | H04N 1/6025 358/3.26 |
| 2012/0251787 A1* | 10/2012 | Mizuno | B44C 5/04 428/165 |
| 2013/0235430 A1* | 9/2013 | Sakatani | B41J 29/393 358/3.23 |
| 2014/0255670 A1* | 9/2014 | Kalwa | B41M 5/0076 427/258 |
| 2015/0077449 A1* | 3/2015 | Kobashi | H04N 1/52 347/7 |
| 2015/0306888 A1* | 10/2015 | Kalwa | B41M 5/0017 428/537.1 |
| 2016/0193857 A1* | 7/2016 | De Mondt | B32B 37/10 52/311.1 |
| 2017/0134617 A1* | 5/2017 | Hayashi | H04N 1/6027 |
| 2017/0232761 A1* | 8/2017 | Pervan | E04F 15/02 347/102 |

OTHER PUBLICATIONS

Written Opinion dated Jan. 20, 2020 relating to PCT/EP2019/078026, 8 pages.
Lutz, Patrik, Handbook of Industrial Inkjet Printing: A Full System Approach, Industrial Inkjet Printing in Decorative Web Print Applications, Chapter 44, pp. 747-759, Nov. 22, 2017.
Eranpurwala, Aliasgar, Handbook of Industrial Inkjet Printing: A Full System Approach, Hymmen Digital Decor Printing: Empowering the Laminate Industry, Chapter 48, pp. 817-832, Nov. 22, 2017.

* cited by examiner

METHOD OF COLOR MAPPING OF OLIGOCHROMATIC PATTERNS

REFERENCE TO RELATED APPLICATIONS

This application is a 371 National Stage Application of PCT/EP2019/078026, filed Oct. 16, 2019, which claims the benefit of European Application No. 18200915.9, filed Oct. 17, 2018, the contents of which are incorporated by reference herein in their entirety.

TECHNICAL FIELD

The present invention is related to a method of color mapping in oligochromatic patterns especially in the manufacturing of decorative layers comprising a digitally printed oligochromatic pattern, such as wood pattern.

BACKGROUND ART

An oligochromatic pattern is a decorative pattern with a few (=oligo, ὸ λίγo) colors (chromatic, χρῶμα). It is typically used in the decorative market such as decorative panels and mainly printed by gravure in said market wherein each of said few colors, further called dominant colors, are printed by a separate ink on a substrate. For example, in the manufacturing of decorative laminates said printed substrate forms a decorative layer, which is resin impregnated and heat pressed on one or more core layers to manufacture a decorative panel.

The conventional printing method for forming said decorative layer evolves in the meantime to a digital printing method by industrial digital printing system, such as an industrial inkjet printing system, which has now proven their flexibility in use, such as variable data printing, making short production runs and personalized products possible, and their enhanced reliability, allowing incorporation into production lines. A historical overview and dedicated case studies of an industrial inkjet print system for printing decorative images on deco-paper to manufacture decorative panels, are disclosed in Chapter 44 "Industrial Inkjet Printing in Decorative Web Print Applications" by Patrik Lutz and Chapter 48 "Hymmen Digital Décor Printing: Empowering the Laminate Industry by Aliasgar Eranpurwala in "Handbook of Industrial Inkjet Printing: A Full System Approach", edited by Werner Zapka (publisher Wiley-VCH Verlag GmbH & Co, 22 Nov. 2017, 984 pages).

A disadvantage of industrial digital printing systems is the difficulty when switching ink/toner on said systems because residues of previous ink or toner remain in the system. Said residues influence the colors in a subsequent print of an oligochromatic pattern. For example residues of pigments/dyes of previous ink/toner are gathered in edges of the ink/toner channels of an ink/toner supplier, such as inkjet printhead, in said industrial digital printing systems. Said residues of pigments/dyes are still deposited when an other ink/toner with other pigments/dyes is used in said ink/toner supplier, which influences chroma/luminance and/or hue of color values in digital printed ink/toner on a substrate for forming a decorative layer. Therefore switching of ink/toner to be capable of digital printing with another dominant color is not doable due to small parts in said ink/toner supplier.

Adding extra ink/toner suppliers for another dominant color is also a solution but economically not feasible due to a high cost of said ink/toner suppliers and constant maintenance of said ink/toner suppliers.

Therefore said industrial digital printing systems for printing decorative layers having 'fixed' set of inks/toners whereby a large output-device-gamut can be achieved. Said set of fixed/toners defines a colorant space of said digital printing systems such as CMYK or even better CRYK for forming decorative layers with wood patterns. For rendering an oligochromatic pattern, color values of said pattern are color mapped to said colorant space.

Industrial digital printing systems in the manufacturing of decorative panels becomes more and more reliable so variable data printing, short production runs, personalized products become possible. Therefore a fast and low memory-consumable method in said printing systems is needed for color mapping color values of oligochromatic patterns before printing and also while printing on a substrate for forming a decorative layer.

SUMMARY OF INVENTION

A fast and low memory-consumable color mapping method of color values of oligochromatic pattern, preferably a wood pattern, is found by the method as defined in claim 1. The method takes further care of the dependency of the colors in said pattern by a determination of a skeleton from the image gamut of said pattern. This method cannot be used in any other kind of patterns because the oligochromatic pattern has typically an elongated image gamut.

The method as defined by claim 1 may be a step of rendering said oligochromatic pattern on an output device, such as an industrial digital printing system or a display; wherein the step of rendering may be a step of color correcting while rendering a plurality of copies of an oligochromatic pattern.

BRIEF DESCRIPTION OF DRAWINGS

The figures from 1 to 8 are illustrations for the present invention; defined in CIELAB (950), as ND-DICS (N-dimensional independent color system), with the axes X (900) for a*; axes Y (901) for L* and axes Z (902) for b*. The Y-coordinates in said ND-DISC is a value for lightness of a color value.

FIG. 2; and FIG. 3.

DESCRIPTION OF EMBODIMENTS

Figure 3:
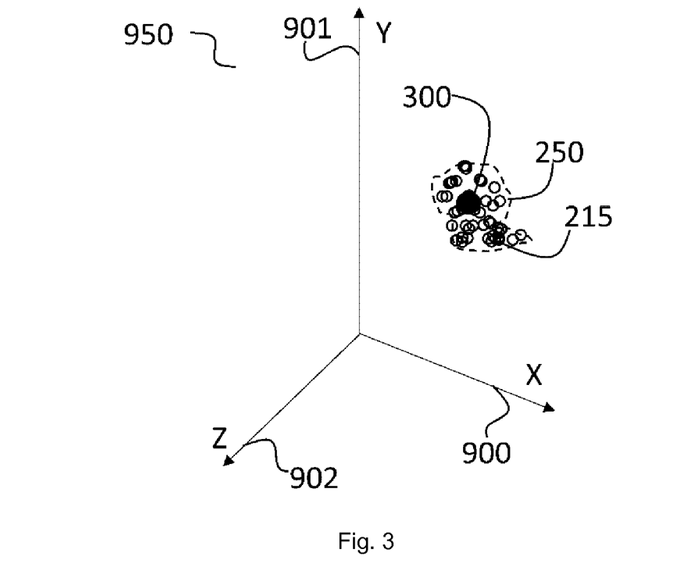
FIG. 3 shows step b) of the present invention; wherein a sub-image-gamut (250), between said two parallel planes (not visible), is determined and said figure shows also step c) wherein a color value is determined in said sub-image-gamut (250); which is here a balance point (300), illustrated as a filled black circle.
Figure 4:
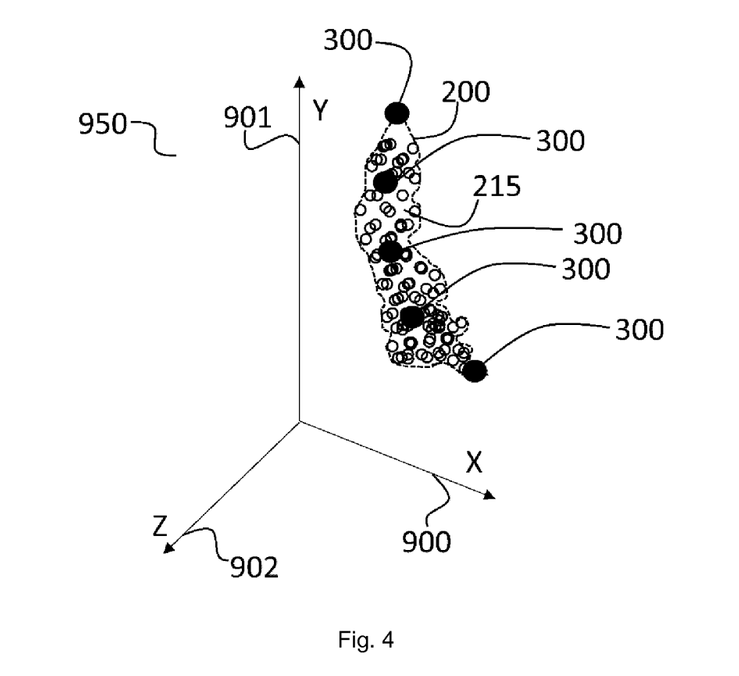
FIG. 4 shows the result of selecting 5 luminance-ranges and determination of 5 balance points (300) in the determined 5 sub-image-gamuts in an image-gamut (200) of the same oligochromatic pattern as FIG. 1.
Figure 5:
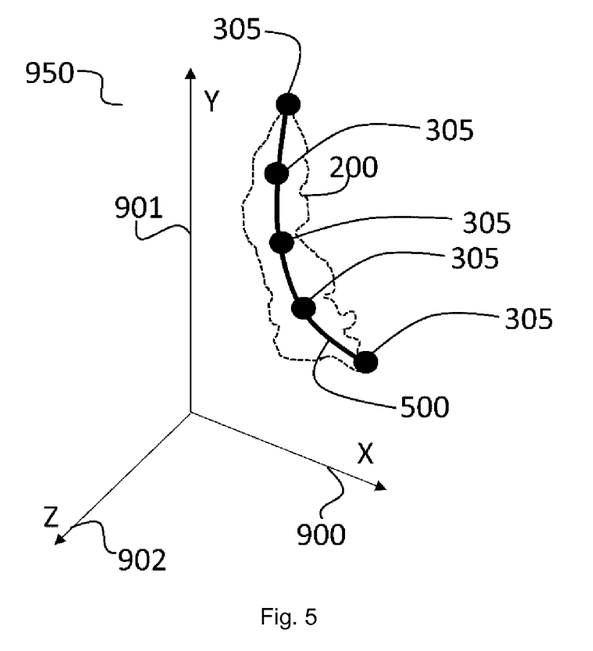
FIG. 5 shows the skeleton (500) of said image-gamut (200) with a plurality of skeleton points (305); wherein said skeleton points are the balance points of FIG. 4.
Figure 6:
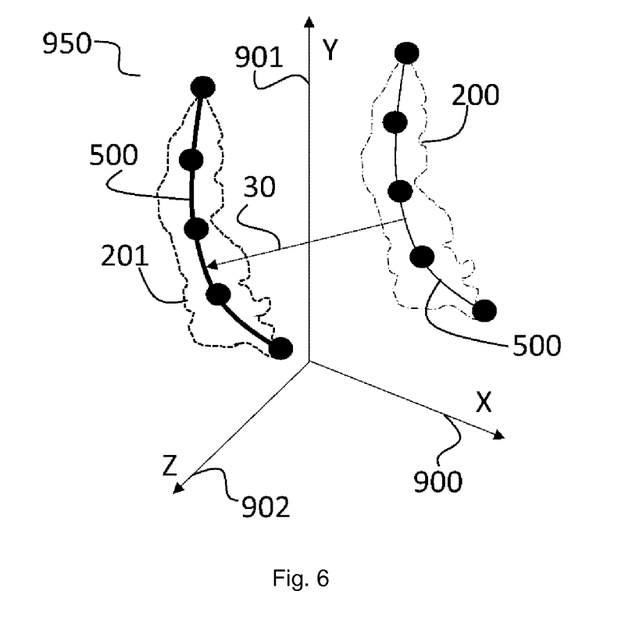
FIG. 6 shows a ND-transformation step (30) of the skeleton (500) of FIG. 5. Said illustrated ND-transformation step (30) is here a geometric translation, as adaption of the right skeleton (500) to the left skeleton (500). Said geometric translation results in an adapted image-gamut (201) as a result of the present invention.
Figure 7:
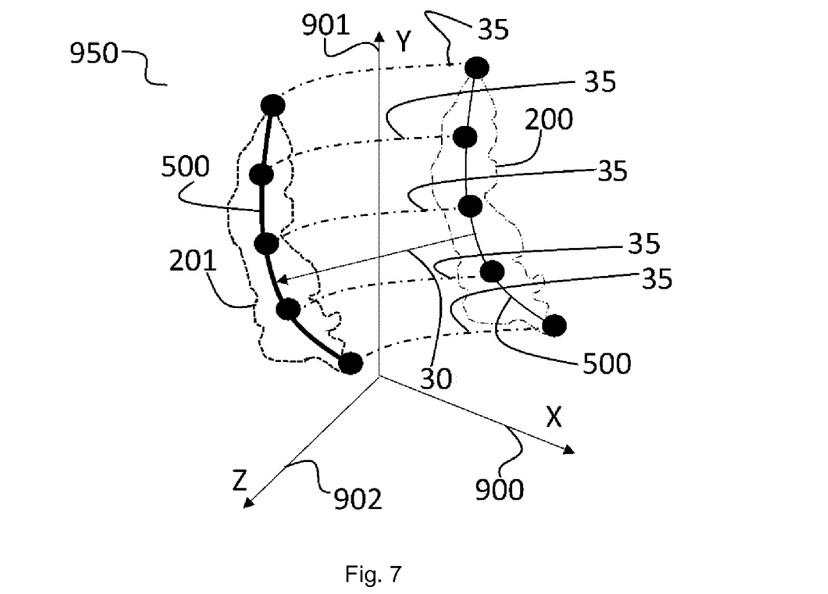
FIG. 7 shows the same ND-transformation step (30) as in FIG. 6 wherein for each skeleton point a path (35) is shown that corresponds to said adaptation.

The present invention is a method of color mapping color values of an oligochromatic pattern, preferably a wood pattern, preferably for forming a decorative layer, comprising the following steps:
- determining an image-gamut (200), in a ND-DICS (=N-dimensional device independent color system), of said oligochromatic pattern; wherein said image-gamut (200) comprises said color values of said oligochromatic pattern; and
- determining a skeleton (500) of said image-gamut (200) (FIG. 5) wherein the skeleton (500) comprises a plurality of points which are determined by:
 a) selecting a range, along a determined axis in said N-dimensional device independent color system; and
 b) determining a sub-image-gamut (250) of said image-gamut; wherein said sub-image-gamut (250) comprises color values whereof a projection towards said determined axis belongs to said range; and
 c) determining a color value in said sub-image-gamut (250) as a point of said skeleton (500); wherein said determined color value is preferably a balance point more preferably a centroid or substantially a centroid of said sub-image-gamut (250) (FIG. 3); and
- performing an adaption on said skeleton (500) in said ND-DICS by a set of ND-transforming steps (FIG. 6) and determining for points, from said skeleton (500), a path (35) (FIG. 7) in said ND-DICS that corresponds to said adaption; and
- color mapping said color values, of said oligochromatic pattern, based on/along said determined paths (35) (FIG. 7) of said points of said skeleton (500).

An axis is hereby a straight line determined in said ND-DICS, which may be an axis of the coordinate system of said ND-DICS. Said axis is preferably determined as a straight line that substantially defines a line of symmetry of said image-gamut (200) or is oriented substantially parallel along said image-gamut.

Figure 1:
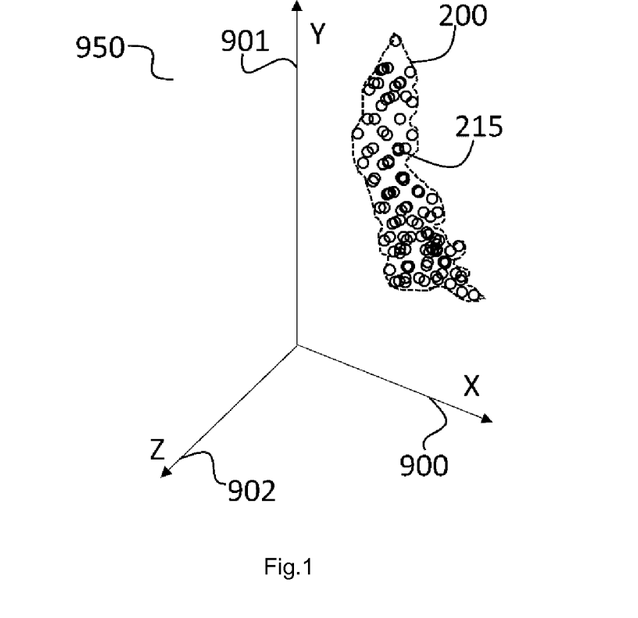
FIG. 1 illustrates an image-gamut (200) of an oligochromatic pattern; comprising a plurality of color values (215) which are illustrated as open circles.
Figure 2:
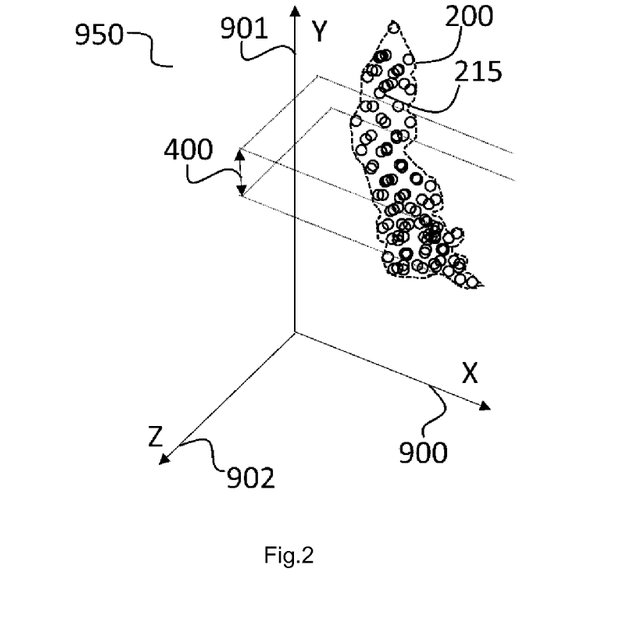
FIG. 2 shows step a) of the present invention wherein a luminance range (400), illustrated as two parallel planes, is selected for the oligochromatic pattern of FIG. 1.

Step a) and b) is in a preferred embodiment:
a) selecting a luminance-range for color values in said ND-DICS (FIG. 1); and
b) determining a sub-image-gamut (250) of said image-gamut (200);
wherein
said sub-image-gamut (250) corresponds to said luminance-range and comprises color values which have a luminance in said corresponding luminance range (FIG. 2).
Herein is said determined axis an axis whereon luminance-factor (lightness) of a color value can be determined and said range is said luminance range.

The image-gamut (200) is a collection of said color values. It may have a confined volume, which is a ND-object wherein said color values belong. A sub-image-gamut (250) is a part of said image-gamut (200), which may have a confined volume. An image-gamut (200) is a particular collection of color values in a ND-DICS. A confined volume is a specific region of a ND-DICS.

ND is the abbreviation of 'N-dimensional', wherein N is an integer larger than one and which is preferably three in the present invention and then abbreviated as 3D for 'three-dimensional'. A DICS is the abbreviation of device independent color system, such as CIELAB, CIELUV, CIELCH or CIEXYZ. A DICS is sometimes also called a color space. A DDCS is the abbreviation of device dependent color system, such as CMYK or comprising tristimulus values of three primary colored lights in a TV tube. A DDCS is sometimes called a colorant space.

Said color values of said oligochromatic pattern are preferably defined in N-dimensional coordinates ($C_1, \ldots, C_{N\ wherein\ N>1}$) of a N-dimensional device independent color system. CIEXYZ or CIELAB, as three-dimensional device independent color system, is a preferred embodiment because it results in a more accurate skeleton (500) of said image-gamut (200). On the Y-axis of CIEXYZ or L-axis of CIELAB a color range is preferably selected for determining said sub-image-gamut (250).

The determination of said skeleton (500) can be performed also fast for example by sorting said color values in order of luminance-factor and then selecting color values in said luminance-range.

Also the determination of a color value as a point on said skeleton (500) may be performed fast by determining a centroid of said sub-image-gamut (250) for example by averaging said color values of said sub-image-gamut (250). Said centroid determination is a preferred embodiment because it determines a more accurate skeleton (500) of said image-gamut (200).

Because the color mapping is based on said points of said skeleton (500), the calculation is fast for said color mapping and memory-usage for storing said points is low. It is found that for oligochromatic patterns, especially wood patterns, the image-gamut (200) is elongated and that color mapping based on a skeleton (500) of said image-gamut (200) is an advantage for fast calculation of said color mapping. Said fast calculation comprises preferably interpolation techniques between said determined paths (35) of the present invention. Such paths (35) can be defined as a vector; a spline or a mathematical function. The interpolation techniques are known for example in mathematical morphology but in the present invention the morphology is based on said paths (35) which are determined on a skeleton of an image gamut. Morphology based on paths is also called path morphing. For clarity an image gamut is not the same as an output device gamut.

The present invention is useful in color-correct reproduction of a decorative panel, comprising a rendered oligochromatic pattern. Color-correct reproduction of a decorative panel means a production of a final product with substantially no color difference between said decorative panel and said final product. It is found that a color-correct reproduction can faster be achieved with the present invention. Color difference can be expressed in $\Delta E_{CIELAB}$ (=delta E calculated with CIELAB tristimulus values). Substantially no color difference means an average color difference, expressed in $\Delta E_{CIELAB;94}$ smaller than 3. Other color difference formula's are $\Delta E_{00}$, $\Delta E_{CMC}(l,c)$.

Also the present invention is useful for fast varying an oligochromatic pattern, such as from light oak pattern to a dark chestnut pattern wherein the nerve structure of the light oak pattern is remained but the background color and/or nerve color changed, by color mapping one or more points of said skeleton (500), which are preferably dominant colors of said oligochromatic pattern.

In a preferred embodiment, said method of color mapping is a step of a method of rendering an oligochromatic pattern on a substrate by a output device, preferably for forming a decorative layer, wherein the skeleton (500) is positioned in an output-device-gamut of said output device, having a colorant space, after the performing step of said adaption for color mapping said color values of said oligochromatic pattern, in said output-device-gamut; and further comprising the steps:
  selecting said output-device-gamut of said output device, in preferably said three-dimensional device independent color system; and
  converting said color mapped color values to said colorant space by a color conversion model. An output-device-gamut is a part in a ND-DICS;
wherein said gamut discloses colors, which are capable to be rendered by said output device. It is known that said gamut depends on the substrate whereon is printed or the used halftoning method for rendering . . . .

In another preferred embodiment, a method of rendering an oligochromatic pattern by an output device, having a colorant space, for forming a decorative layer; comprises the invention and its preferred embodiments of said color mapping method;
wherein the performing step of said adaption on said skeleton (500) is for positioning said skeleton (500) in an output-device-gamut of said output-device wherein said method of rendering comprises the step:
  converting said color mapped color values to said colorant space by a color conversion model, which defines a function of ND-DICS to said colorant space. Said function can be described as look-up-table (LUT) where between elements of said LUT needs to be interpolated.

By set preferred embodiment said color values are color mapped so they can reproduced correctly in the output-device-gamut and no clipping occur of color values outside said output-device-gamut, else it may result in chroma/hue or luminance jumps in the rendered oligochromatic pattern.

The output device is preferably a display and more preferably an industrial digital printing system and most preferably an industrial inkjet printing system.

Additionally said preferred embodiment may be part of color controlling for, preferably while, rendering a plurality of copies of an oligochromatic pattern on an industrial digital printing system, preferably for forming one or more decorative layers, wherein said rendering of plurality of copies comprises the following steps:
  selecting one or more color values near said skeleton (500) or near an end point, cross point, inflection point of said skeleton (500), preferably selecting one or more color values on said skeleton (500), more preferably selecting one or more colors of said points of said skeleton (500);
  determining one or more positions of said selected one or more color values in said oligochromatic pattern;
  measuring in said positions on a first copy of said copies of said oligochromatic pattern;
  comparing said measurements with said selected color values of said skeleton (500); and
  rendering a second copy of said copies, after said first copy, with said color mapped color values of the color mapping method of the present invention; and
wherein the step of performing said adaption on said skeleton (500) by a set of ND-transforming steps is based on said comparing.

The more positions are determined for said color value, the higher the accuracy and better color control is achieved, such as suppress left and right color differences on a substrate; suppress heat fluctuations in inkjet print heads, which results in density variations; suppress less curing of inks while rendering.

A color value near a skeleton (500) means a color value having a minimum color difference between said color value and the skeleton (500) that is smaller than $3\ \Delta E_{CIELAB,\ 94}$. In de present invention said minimum is preferably smaller than $1\ \Delta E_{CIELAB,\ 94}$ and more preferably equal to 0 (=a color value selected on said skeleton (500)). A smaller minimum is preferred because it is found that it guarantees a better rendering and better color controlling.

A color value near an end point; an inflection point or a cross point on said skeleton (500) means a color value having a minimum color difference between said color value and said specific point (end, inflection, cross) that is smaller than $3\ \Delta E_{CIELAB,\ 94}$. In de present invention said minimum is preferably smaller than $1\ \Delta E_{CIELAB,\ 94}$ and more preferably equal to 0 (=a color value selected from said skeleton (500); which may be an end point, and inflection point or cross point of said skeleton (500)). A smaller minimum is preferred because it is found that it guarantees a better rendering and better color controlling.

In said preferred embodiment the position determination and measuring in said positions is performed on a color patch attached to or generated with said oligochromatic pattern but preferably on said rendered oligochromatic pattern itself, thus performed on content of the oligochromatic pattern of the first copy.

If the measurement is performed in said rendered oligochromatic pattern more space on the substrate is available, which is economically an advantage because less substrate is used and larger oligochromatic patterns can be rendered.

The measurements are done by a color measuring device such as a spectrophotometer or an RGB linescan camera system.

The selection of color values on said skeleton (500) may be comprising a selection of an end point, an inflection point or a cross point on said skeleton (500). It is found that an end point, inflection point or cross point on a said skeleton (500) ensures a better color mapping of said color values of said oligochromatic pattern because said points determines mainly the form of the image-gamut (200) of said oligochromatic pattern.

The present invention of a method of color mapping may also be a step of rendering an oligochromatic pattern on a display carried out by a data processing apparatus, connected to said display, which comprises the following additional steps:
  displaying said skeleton (500) on said display; and
  displaying said oligochromatic pattern with said color mapped color values on said display; and
preferably wherein said adjustment to said skeleton (500) is performed by performing an adjustment to said displayed skeleton (500) by an input controller, such as a computer mouse, connected/linked to said data processing apparatus. Said oligochromatic pattern, before color mapping, may also be displayed for visual comparing it with said oligochromatic pattern with said color mapped color values.

Methods of displaying an object defined in N dimensions, such as here said skeleton (500) or points on said skeleton (500), on a display, such as a computer-monitor, are well-known by a skilled person, which comprises projection methods from N dimensions to two dimensions. Such objects may also be displayed as movable objects such as rotations, translations or morphs by using said projection methods. Said projection methods are for example used in 3D Computer Aided Drawing (CAD)—software applications.

Preferably said method of rendering on a display may comprise additionally:
- displaying an output-gamut or its confined volume of a selected output-device; and/or
- displaying said image-gamut (200) of said oligochromatic pattern or a confined volume of said image-gamut (200); and/or
- displaying statistical information of points on said skeleton (500) such as number of appearance in said oligochromatic pattern; and/or
- displaying statistical information of measured color values of said oligochromatic pattern, before using the color mapping method and said oligochromatic pattern with said color mapped color values; and/or
- displaying a point or all points of said plurality of points forming the skeleton (500) by a shape such as a point, sphere or cuboid, which preferably is displayed substantially in its color value. Said point or all points may preferably individually adjusted by said input controller wherein the skeleton (500) then is refreshed on said display according to such adjusted point on said skeleton (500). Said displayed objects such a skeleton (500), points of skeleton (500), output-gamut may be displayed with a certain transparency on top of each other.

Statistical information may be histograms, averages, X-bar control charts or R-charts, t-distribution charts, trend lines . . . Said statistical information and displaying said skeleton (500) is important for assisting the operator performing for example color-correct digital printed decorative layers. Comparing color values may be performed by calculating color differences, such as $dE_{CIELAB,94}$.

In said step of rendering an oligochromatic pattern on a display, said ND-transforming steps in the adjustment of said skeleton (500), preferably includes a geometric translation for varying said color values of said oligochromatic pattern and for preserving the color-value-relationship between color values of neighbouring pixel elements of said oligochromatic pattern and/or preferably includes a scaling in one dimension for varying said color values of said oligochromatic pattern and for preserving the chroma-, hue- or luminance-relationship between color values of neighbouring pixel elements of said oligochromatic pattern.

Said display has a certain colorant space, such as RGB. Preferably, for displaying said oligochromatic pattern with said color mapped color values is converted to the colorant space of said display by a color conversion model for converting color values of said ND-DICS to said colorant space. The operator has than the advantage to have substantially a color correct visualization of said oligochromatic pattern with color mapped color values.

In a preferred embodiment said set of ND-transforming steps includes a geometric translation for varying said color values of said oligochromatic pattern and for preserving the color relationship between color values of neighbouring pixel elements of the oligochromatic pattern. If the color relationship is preserved, the oligochromatic pattern with color mapped color values no color jumps occur in rendered oligochromatic pattern after color mapping. Such jump are annoying in a decorative layer or in a final product such as a decorative panel and not acceptable by the final user.

And in another preferred embodiment said set of ND-transforming steps includes a scaling in one dimension for varying said color values of said oligochromatic pattern and for preserving the chroma relationship; hue relationship or luminance relationship between color values of neighbouring pixel elements of the oligochromatic pattern. If the chroma/hue or luminance relationship is preserved, the oligochromatic pattern with color mapped color values no chroma/hue or luminance jumps occur after color mapping. Such jump are annoying in a decorative layer or in a final product such as a decorative panel and not acceptable by the final user.

Definitions and Other Preferred Embodiments

Oligochromatic Pattern

An oligochromatic pattern is a decorative pattern with a few (=oligo, ὀλίγο) colors (chromatic, χρωμα). An oligochromatic pattern is formed by color shade combinations of minimum two and maximum eight dominant color values but mainly maximum five dominant color values. Thus not less than two because it should than be a monochromatic pattern and not more than eight because it should than be a polychromatic pattern, which comprises also multiple objects instead of maximum 8 objects in such oligochromatic pattern.

Such oligochromatic pattern is preferably in the present invention a wood pattern. A wood pattern has a tone, a contrast color, wood grain lines and sometimes wood pores and/or wood imperfections such as knot and cracks. The tone in a wood pattern, also called background or wood color, may be calculated by determining the color in a color histogram of the wood pattern, namely the color that dominates the most in the color histogram. Other ways of such determination is done by using singular value decomposition techniques. The contrast color of a wood pattern is a color in the wood pattern which has the highest color difference with the background color such as the highest $\Delta E_{CIELAB,94}$. The colors in wood grain lines, wood pores and/or wood imperfections are in most wood patterns determined nearby said contrast color. A wood pattern has typical characteristics wherein wood grain lines are elongated in a dominant direction, called the nerve direction and between these wood grain lines the tone of the wood image is determined. The elongated wood grain lines are lines repeated with variances in frequency on top of said tone.

An oligochromatic pattern is a specific color image; which is achieved by suitable commercially available hardware such as an image scanner and which may manipulated by commercially available software such as Adobe Photoshop™. The content of a oligochromatic pattern is preferable defined in raster graphics format such as Portable Network Graphics (PNG), Tagged Image File Format (TIFF), Adobe Photoshop Document (PSD) or Joint Photographic Experts Group (JPEG) or bitmap (BMP) but more preferably in vector graphics format, wherein the oligochromatic pattern as raster graphics format is embedded. Preferred vector graphics formats are Scale Vector Graphics (SVG) and AutoCad Drawing Exchange Format (DXF) and most preferably, the oligochromatic pattern is embedded in a page description language (PDL) such as Postscript (PS) or Portable Document Format (PDF). Said oligochromatic pattern may be stored and/or loaded as one or more files on a memory of a data processing apparatus, such as a computer. The embodiment may comprise a method to load said oligochromatic pattern into a memory of a data processing apparatus.

Of an image an image-gamut (200) may be determined. Said image-gamut (200) is a collection of color values defined for a certain ND-DICS; whereof said color values are comprised in said image.

Manufacturing Decorative Panels

The oligochromatic pattern is preferably used for rendering on a substrate, more preferably for forming a decorative layer wherein said pattern is rendered on a substrate, such as deco-paper. Said decorative layer may than be used for manufacturing decorative panels mainly used as decorative flooring, decorative wall. Said decorative layer includes a thermosetting resin impregnated deco-paper, which is than assembled with one or more core layer in a heat press to form a decorative panel. A score layer is preferably a board material composed substantially of wood fibres but also a synthetic core layer may be used. A deco-paper is preferably a paper with a porosity according to Gurley's method (DIN 53120) between 8 and 20 seconds. Suitable paper sheets having high porosity and their manufacturing are also disclosed by U.S. Pat. No. 6,709,764 (ARJO WIGGINS). Due to said porosity, color mapping with the use of the skeleton (500) of the present invention it has been found that it has a high accuracy without the existence of tone jumps or color jumps after the color mapping.

Deco Workflow System

To manage the rendering of oligochromatic patterns on a substrate by an industrial digital printing system for example in a method of manufacturing decorative panels, the embodiment may be performed by a deco workflow system, which for example carries out determining oligochromatic patterns, color mapping of oligochromatic patterns, imposing or nesting a plurality of oligochromatic patterns on a substrate and/or digital cutting decorative panels comprising the rendered oligochromatic pattern. Said deco workflow system comprises preferably a data processing apparatus, such as a computer for handling said rendering.

Rendering is a stage comprising the step of halftoning an image and transferring the halftoned image to a marking device and marking the transferred halftoned image by the marking device. Halftoning, sometimes called screening is converting a continuous-tone bitmap into a halftone (pattern of dots). Two halftoning methods, also called halftoning types, are Amplitude Modulation (AM) screening and Frequency Modulation (FM) screening, also called stochastic screening.

The deco workflow system comprises a halftoning unit for halftoning, preferably comprises a RIP (raster image processor) for rasterizing vector graphics, such as marks as explained above, in graphic files comprising the oligochromatic pattern and more preferably comprises additionally a color management system for converting oligochromatic patterns to the colors of the inks of the marking device, also called the colorant space. The deco workflow system comprises preferably a management information system (MIS) to provide information that the manufacturing of decorative panels require to manage themselves efficiently and effectively and to analyse and to facilitate strategic and operational activities.

To handle the mixture of oligochromatic patterns by imposition or nesting, a deco workflow system is important, for example to know from each imposed or nested decorative panel the correct imposed or nested oligochromatic pattern. This may be monitored by reading marks; which are rendered on the imposed or nested decorative panel wherein the readings are feed back to the deco workflow system. The rendered mark is preferably selected from cut marks; saw marks; alignment marks; control marks; information codes of an imposed or nested oligochromatic pattern; information codes of the print parameters of an imposed or nested oligochromatic pattern; information text of an imposed or nested oligochromatic pattern; and information text of an imposed or nested oligochromatic pattern.

The deco workflow system may manage the forming of relief on a decorative panel comprising a rendered oligochromatic pattern.

The deco workflow system operates a program, preferably on a data processing apparatus; wherein preferably a display is connected.

Part or whole of the deco workflow system and/or the functional units or blocks thereof may be implemented in one or more circuits or circuitry, such as an integrated circuit(s) or as an LSI (large scale integration). Each functional unit or block of the deco workflow system may be individually made into an integrated circuit chip. Alternatively, part or whole of the functional units or blocks may be integrated and made into an integrated circuit chip.

A program, which is operated in the deco workflow system according to various preferred embodiments of the present invention, is a program controlling a processor in order to realize functions of the various preferred embodiments according to the present invention. Therefore, information which is handled by the deco workflow system is temporarily accumulated in a RAM at the time of the processing. Thereafter, the information may be stored in various types of circuitry in the form of ROMs and HDDs, and read out by circuitry within, or included in combination with, the deco workflow system as necessary, and modification or write-in is performed thereto. As a recording medium storing the program, any one of a semiconductor medium (for example, the ROM, a non-volatile memory card or the like), an optical recording medium (for example a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer, which is connected through a network such as the Internet. In this case, a storage device of the server computer is also included in the present invention. In addition, a portion of a terminal device, a wireless base station, a host system, or other devices, or the whole thereof may be realized as an LSI, which is typically an integrated circuit. Each functional unit or block of the deco workflow system may be individually chipped, or a portion thereof, or the whole thereof may be chipped by being integrated. In a case of making each functional block or unit as an integrated circuit, an integrated circuit controller that controls the integrated circuits, is added.

Finally, it should be noted that the description referring to "circuit" or "circuitry" is in no way limited to an implementation that is hardware only, and as persons of ordinary skill in the relevant art would know and understand, such descriptions and recitations of "circuit" or "circuitry" include combined hardware and software implementations in which the circuit or circuitry is operative to perform functions and operations based on machine readable programs, software or other instructions in any form that are usable to operate the circuit or circuitry.

Deco Storefront

In a preferred embodiment, a cloud-based web-to-render solution may be comprised in the deco workflow system to enable decorative panel service providers or decorative panel buyers to create and manage online stores for manufacturing of decorative panels comprising a rendered oligochromatic pattern. Such solution is called a deco storefront.

Preferably, a deco storefront is marketed as a hosted cloud service so there is no high initial investment needed in servers, software, databases or expensive symmetrical internet connections. This reduces the cost of deploying stores and improves their time-to-market.

The deco storefront may have an easy manageable store centre, which is the central hub from which stores are set up and orders are tracked. Its dashboard preferably provides instant feedback about incoming orders and the status of orders that are in progress.

The deco storefront preferably comprises an online editor wherein decorative panel service providers or editors may edit oligochromatic patterns; wherein said color mapping method of the present invention may be used. This gives the ability to the decorative panel service providers an innovative way of creating personalized decorative panels.

The integration of the deco storefront in a deco workflow system may increase the efficiency by saving time in for example the automatically downloading and processing orders of decorative panels comprising rendered oligochromatic patterns.

Graphic Processing Units

Preferably the rendering step or color mapping is performed by one or more Graphic Processing Units (GPU's). They have been used to render and image manipulation computer graphics for years. Nowadays they are also used for general-purpose tasks due to their highly parallel structure, making them more efficient than Central Processing Units (CPU's). GPU's in the present invention are an advantage in the present invention namely for rendering the oligochromatic pattern but also for the color mapping of the oligochromatic pattern.

GPU's can be combined with CPU's to achieve greater performance. In this way, serial parts of the code would run on the CPU and parallel parts would do it on the GPU. While CPU's with multiple cores are available for every new computer and allow the use of parallel computing, these are focused on having a few high performance cores. On the other hand, GPU's have an architecture consisting of thousands of lower performance cores, making them especially useful when large amount of data have to be processed.

Skeleton (500)

Figure 8:
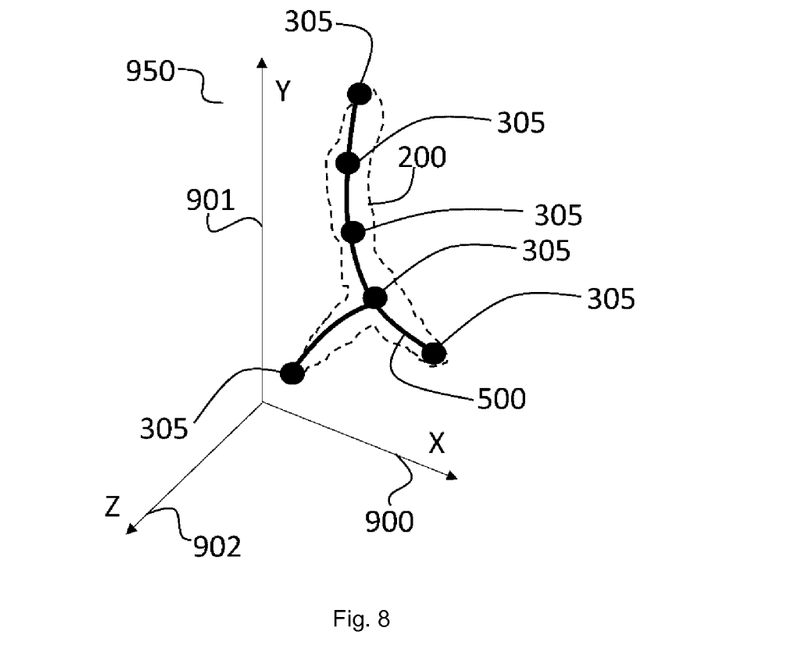
FIG. 8 shows a skeleton (500) of an image-gamut (200) of another oligochromatic pattern as in the previous figures. The skeleton (500) is determined according the present invention and shows hereby a skeleton (500) comprising a cross point in its skeleton points (305)

A skeleton (500) is a narrowed/thinned version of an ND-object in an ND-space. In the present invention is said ND-object an image-gamut (200) of an oligochromatic pattern. A skeleton (500) in said ND-space comprises ND-points, preferably 3D-points forming a wire or multiple wires with linked or connected ND-points. The skeleton (500) forms between said linked ND-points preferably one path or a path with a set of side paths. Two of said ND-points are linked or connect together by a sub-path. A path is a sequence of minimal one such sub-paths. The skeleton (500) of an image-gamut (200) of an oligochromatic pattern has a path with a maximum of 5 side paths. FIG. 8 shows a skeleton (500) of an oligochromatic pattern with side path.

If the oligochromatic pattern is a wood pattern it is found that the skeleton (500) has maximum 2 side paths but mostly no side paths.

A sub-path may be a straight line but also a curve defined as a ND-function between ND-points such as a polynom, Bezier curve or a parametric equation. The linked or connected sub-paths that forms said skeleton (500) are not necessary defined by the same ND-function. A ND-point is preferably defined as a point with N coordinate values as typically used in a Cartesian coordinate system. A polar coordinate system may also be used. A skeleton (500) maybe a medial axis of said ND-object.

The image-gamut (200) may be thinned to a skeleton. Thinning algorithms are well-known. Some of them are disclosed in Chapter 9 of "Algorithms for Graphics and Image Processing", by Theo Pavlidis, ISBN 0-914864-65-X, published by Computer Science Press, 1982.

Another way of determining a skeleton may be performed for a skeleton (500) having a plurality of points (305), wherein said points are determined by a1) selecting a straight line in the N-dimensional device independent color system; and a2) selecting a range, along said selected straight line; and b) selecting a sub-image-gamut (250) of said image-gamut; wherein said sub-image-gamut (250) comprises color values whereof a projection towards said selected straight line belongs to said range; and c) selecting a color value in said sub-image-gamut (250) as a point of said skeleton (500).

Output Device

An output device is hereby an apparatus for reproduction of images and/or text such as a display or an inkjet printer. Examples of output devices that are used to reproduce an image are CRT's, LCD's, plasma display panels (PDP), electroluminescent displays (ELD), carbon nanotubes, quantum dot displays, laser TV's, Electronic paper, E ink, projection displays, conventional photography, electrophotography, dot matrix printers, thermal transfer printers, dye sublimation printers and inkjet systems to name a few.

An output device has a certain colorant space, such as RGB (Red, Green, Blue) or CMYK (Cyan Magenta, Yellow, Black), which determines the colorants that can be used for reproduction an image on said output device. It is found for the reproduction of wood patterns that an output device is preferably CRYK (Cyan, Red, Yellow and Black) or CRY (Cyan, Red and Yellow) because said colorant space is broad enough for rendering wood patterns.

Said output device is capable of rendering a plurality of color values, defined in a ND-DICS. Said color values are collected in an output-device-gamut of said output device. Said output-device-gamut may have a confined volume, which is a volume wherein said color values belong. The larger said output-device-gamut, the more colors can be reproduced.

Color Conversion Model

The color conversion model is a mathematical relation that expresses color values of an ND-DICS to a colorant space of an output device and vice-versa.

Based on sampling points in a colorant space, which corresponds to colors measured in a ND-DICS, a correlation can be found between said sampling points and said color measurements. The correlation is preferably defined in look-up-tables (LUT's) wherein each color achievable in a colorant space can be calculated with mathematical expressions, such as interpolation, to a color value in said ND-DICS and wherein color values in an output-device-gamut can be calculated to coordinates in said colorant space.

A well-known ND-DICS is CIELAB. The term CIELAB refers to the prior art device independent color space defined by the Commission Internationale De L'Eclairage (CIE). Those skilled in the art will recognize that the CIELAB color space is widely used in the fields of digital imaging and color gamut mapping. The use of the CIELAB color space or CIEXYZ throughout this disclosure is meant to serve as an example of ND-DICS.

An example of such LUT's; which is widely known and accepted in the art, defined by the International Color Consortium (ICC); is Specification ICC. 1:2001-12 "File Format For Color Profiles". An ICC profile for an output device specifies how to convert to/from device dependent color system (DDCS) from/to a device independent color system (DICS) so that images may be communicated from one output device to another.

The ICC profile format, of course, simply provides a file format in which a color transform, also called a color conversion model, is stored. The color transform itself, which is typically encoded as a multidimensional look-up table, is what specifies the mathematical conversion from one color space to another. Other formats may also be used for storing said LUT's disclosed in blockchain technology.

Said color conversion models are used for color-correct production wherein a rendered image simulates color-correct the image. A color-correct production means that the average color difference between image and said rendered image is low, preferably smaller than 10 $\Delta E_{CIELAB;94}$; more preferably smaller than 3 $\Delta E_{CIELAB;94}$. $\Delta E_{CIELAB;94}$ is a well-known function for calculating color differences in CIELAB. It is published by technical committee of the CIE (TC1-29) in 1995.

Color Measuring Device

The color measuring device in the present invention is preferably a RGB line scanner, which are known in the field of machine vision or spectrophotometers. The connection of a color measuring device to a data processing apparatus for gathering color measurements may be performed by a linkage via a network, such as a LAN(=local area network). The color measurements may be stored in the memory accessible by said data processing apparatus:

The color measuring device in the present invention is preferably an RGB or spectral measurement line-scan imaging sensor for acquiring line per line a rendered oligochromatic pattern; wherein the lines may be formatted to measurement rows. Said color measuring device preferably is capable of sensing in a plurality of different spectral ranges.

Luminance-Factor/Lightness

Luminance-factor a photometric measure of the luminous intensity. It describes the amount of light that passes through, is emitted or reflected from a particular area.

In the present invention the luminance range consists of a minimum luminance-factor and a maximum luminance-factor; wherein the minimum luminance-factor and maximum luminance-factor may be equal to each other.

In a preferred embodiment, a plurality of luminance ranges are selected that succeeds, preferably succeeds equidistant, each other for having an accurate skeleton (500) of the image-gamut (200).

A determination of luminance-factor of a color value in a ND-DICS is well-known by a skilled person. For CIELAB as ND-DICS the L*-value is a measure of lightness, thus luminance-factor, of a color value. Conversion models and/ or mathematical functions between ND-DICS are also known by said skilled person.

Of a color value in a ND-DICS also chrominance (chroma), hue and saturation can be calculated by conversion models and/or mathematical functions.

Balance Point of a Collection of ND-Points

A balance point of a collection of ND-points is a point that fulfills a predetermined condition based on said collection of ND-points. For example a balance point may be a centroid of said collection of ND-points; it may be an average of said collection of ND-points or it may be a weighted average of said collection of ND-points.

Hereby, as example, several conditions for determining a balance point of a collection of m 3D-points ($p_1$, $p_2$, $p_3$, ... $p_m$) wherein $p_i$ has three coordinates $\{a_i, b_i, c_i\}$ with i=1 ... m:

$$p_{balance} = \{\text{average } (a_i); \text{average } (b_i); \text{average } (c_i)\}$$
with i=1 ... m; or $$p_{balance} = \{(\Sigma q_a \times a_i + r_a)/m; (\Sigma q_b \times b_i + r_b)/m; (\Sigma q_c \times c_i + r_c)/m\}$$
with i=1 ... m and $q_a$; $r_a$; $q_b$; $r_b$; $q_c$; and $r_c$ as weight factors.

Said collection of ND-points forms a confined volume in an ND-space. Of said confined volume; which is an ND-object; a centroid (as predetermined condition) may be determined; which may than be a balance point of said collection of ND-points. A balance point does not necessary to be one of said ND-points in the collection, but for the embodiment of color controlling for an output device in the present invention; a balance point is better one of said ND-points in the collection. A balance point does not necessary to be part of said confined volume but it is in the present invention preferred to form a skeleton (500) of an oligochromatic pattern that corresponds better to each other.

Determination of a centroid of a confined volume or a collection of ND-points is well-known in mathematics. It is sometimes called geometric center.

ND-Transformation Step

ND transformation on objects in an ND-space; such as said skeleton (500) in the present invention, are for example known in geometry such as translation, rotation, reflection.

The ND-transformation step may in the present invention also be geometric transformation of points that forms the skeleton (500), it even comprises the transformation on sub-paths between said points; if said sub-paths are defined. If for example said sub-paths are defined as a spline with one or more anchor points. Said one or more anchor points may be adapted as ND-transformation step for said skeleton (500).

| Reference signs list | |
|---|---|
| 30 | ND-transformation-step |
| 35 | path corresponding to adaptation |
| 200 | image-gamut |
| 201 | adapted image-gamut |
| 215 | color value |
| 250 | sub-image-gamut |
| 300 | balance point |
| 305 | point of a skeleton |
| 400 | luminance-range |
| 500 | skeleton |
| 900 | X-axes |
| 901 | Y-axes |
| 902 | Z-axes |
| 950 | CIELAB as ND-DICS |

The invention claimed is:

1. A method of mapping color values of an oligochromatic pattern comprising the following steps:
   determining an image-gamut of said oligochromatic pattern in an N-dimensional device independent color system, wherein N>1 and said image-gamut comprises color values of said oligochromatic pattern;
   determining a skeleton of said image-gamut;
   performing an adaptation of said skeleton, the adaptation comprising a set of N-dimensional transformation steps in said N-dimensional device independent color system;
   determining, for points of said skeleton, a path in said N-dimensional device independent color system that corresponds to said adaptation; and
   mapping said color values of said oligochromatic pattern along said determined path,
   wherein the oligochromatic pattern is a wood pattern, the step of determining the skeleton comprises determining a plurality of points forming said skeleton, and said plurality of points are determined by:
   selecting a straight line in the N-dimensional device independent color system;
   selecting a range along said selected straight line;
   selecting a sub-image-gamut of said image-gamut, wherein said sub-image-gamut comprises color values of which a projection towards said selected straight line belongs to said range; and
   selecting a balance point in said sub-image-gamut as a point of said skeleton.

2. The method according to claim 1, wherein the balance point is essentially a centroid of said sub-image-gamut.

3. A method of rendering a wood pattern by an output device having a colorant space, said method comprising:
   the method according to claim 1, wherein the step of performing the adaptation on the skeleton is for positioning the skeleton in an output-device-gamut of said output-device; and
   the step of converting the color mapped color values to said colorant space by a color conversion model, which defines a function in an N-dimensional device independent color system to said colorant space.

4. A method of color controlling while printing a plurality of copies of a wood pattern on an industrial digital printing system, wherein said method of color controlling comprises the following steps:
   selecting one or more color values having a color difference $\Delta_{ECIELAB,94}$ with the skeleton which is smaller than 3;
   determining one or more positions of said selected color values in said wood pattern;
   color measuring in said one or more positions on a first copy of said plurality of copies by a color measuring device;
   comparing said color measurements of said one or more positions with said selected one or more color values; and
   printing a second copy of said plurality of copies, after said first copy, with color mapped color values from a color mapping method according to claim 1, wherein the step of performing the adaption on said skeleton by a set of N-dimensional-transforming steps is based on the step of comparing.

5. The method according to claim 4, wherein the position determination and the measurement in the one or more positions is performed:
   on one or more color patches attached to or generated at the wood pattern; or
   on content of said wood pattern of the first copy.

6. The method according to claim 4, wherein the selection of the one or more color values comprises a selection of at least one of an end point, an inflection point and a cross point on the skeleton.

7. A method of mapping color values of an oligochromatic pattern comprising the following steps:
   determining an image-gamut of said oligochromatic pattern in an N-dimensional device independent color system, wherein N>1 and said image-gamut comprises color values of said oligochromatic pattern;
   determining a skeleton of said image-gamut
   performing an adaptation of said skeleton, the adaptation comprising a set of N-dimensional transformation steps in said N-dimensional device independent color system;
   determining, for points of said skeleton, a path in said N-dimensional device independent color system that corresponds to said adaptation; and
   mapping said color values of said oligochromatic pattern along said determined path,
   wherein the oligochromatic pattern is a wood pattern, wherein the step of determining the skeleton comprises determining a plurality of points forming said skeleton, and wherein said plurality of points are determined by:
   selecting a straight line in the N-dimensional device independent color system;
   selecting a range along said selected straight line;
   selecting a sub-image-gamut of said image-gamut; wherein said sub-image-gamut comprises color values of which a projection towards said selected straight line belongs to said range; and
   selecting a color value in said sub-image-gamut as a point of said skeleton.

* * * * *